United States Patent
Huang et al.

(10) Patent No.: US 12,395,253 B2
(45) Date of Patent: Aug. 19, 2025

(54) TRANSMITTER AND POWER CALIBRATION METHOD

(71) Applicant: REALTEK SEMICONDUCTOR CORPORATION, Hsinchu (TW)

(72) Inventors: Chia-Wei Huang, Hsinchu (TW); Yi-Hua Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 351 days.

(21) Appl. No.: 18/204,399

(22) Filed: Jun. 1, 2023

(65) Prior Publication Data
US 2023/0421271 A1   Dec. 28, 2023

(30) Foreign Application Priority Data
Jun. 23, 2022 (TW) .................. 111123459

(51) Int. Cl.
*H04B 17/12* (2015.01)
*H04B 17/10* (2015.01)
*H04B 17/318* (2015.01)

(52) U.S. Cl.
CPC .......... *H04B 17/12* (2015.01); *H04B 17/102* (2015.01); *H04B 17/318* (2015.01)

(58) Field of Classification Search
CPC ..................................... H04B 17/12
See application file for complete search history.

(56) References Cited

U.S. PATENT DOCUMENTS

| | | | |
|---|---|---|---|
| 2006/0214826 A1* | 9/2006 | Huang | H04B 3/00 341/51 |
| 2016/0178676 A1* | 6/2016 | Wallman | H04B 5/26 702/61 |
| 2020/0209108 A1* | 7/2020 | Deng | G02B 6/4286 |

* cited by examiner

Primary Examiner — Hsinchun Liao
(74) Attorney, Agent, or Firm — WPAT, PC (57) ABSTRACT

A transmitter includes a transmitter circuit, a calibration circuit, and a transmitter signal strength indicator circuit. The transmitter circuit is coupled to a power node to receive a supply voltage and transmits an output signal via an antenna. The calibration circuit senses a current of the power node when the transmitter circuit operates in a first frequency band and operates in a second frequency band to generate a signal having different values and generates a calibration signal according to the signals having the different values. The transmitter signal strength indicator circuit detects power of the output signal to generate a first detection signal, and generate a second detection signal according to the calibration signal and the first detection signal. The transmitter circuit adjusts the power of the output signal to be target power according to the second detection signal.

20 Claims, 6 Drawing Sheets

| Impedance information | | First frequency band (low frequency band) | | | second frequency band (medium frequency band) | | | third frequency band (high frequency band) | | |
|---|---|---|---|---|---|---|---|---|---|---|
| Reflection coefficient | Phase | Power | Power compensation amount | Current value | Power | Power compensation amount | Current value | Power | Power compensation amount | Current value |
| 0.5 | 0 | 14.8 | 1.2 | 322.65 | 15.23 | 0.77 | 322.56 | 14.32 | 1.68 | 356.42 |
| 0.5 | 30 | 14.3 | 1.7 | 306.27 | 15.76 | 0.24 | 337.42 | 14.25 | 1.75 | 345.47 |
| 0.5 | 60 | 13.92 | 2.08 | 300.38 | 16.03 | -0.03 | 349.5 | 14.41 | 1.59 | 329.55 |
| 0.5 | 90 | 13.86 | 2.14 | 298.98 | 16.01 | -0.01 | 354.07 | 14.63 | 1.37 | 320.69 |
| 0.5 | 120 | 14.09 | 1.91 | 300.79 | 15.73 | 0.27 | 351.31 | 15.06 | 0.94 | 315.52 |
| 0.5 | 150 | 14.44 | 1.56 | 300.74 | 15.28 | 0.72 | 342.02 | 15.41 | 0.59 | 315.91 |
| 0.5 | 180 | 14.98 | 1.02 | 324.09 | 14.7 | 1.3 | 329.19 | 15.85 | 0.15 | 322.89 |
| 0.5 | 210 | 15.74 | 0.26 | 340.33 | 14.26 | 1.74 | 313.57 | 16.27 | -0.27 | 343.46 |
| 0.5 | 240 | 16.29 | -0.29 | 354.12 | 14.11 | 1.89 | 305.38 | 16.15 | -0.15 | 358.63 |
| 0.5 | 270 | 16.48 | -0.48 | 357.9 | 14.09 | 1.91 | 300.32 | 15.81 | 0.19 | 368.32 |
| 0.5 | 300 | 16.21 | -0.21 | 351.35 | 14.29 | 1.71 | 299.98 | 15.33 | 0.67 | 371.13 |
| 0.5 | 330 | 15.48 | 0.52 | 337.43 | 14.75 | 1.25 | 306.08 | 14.84 | 1.16 | 366.21 |

Target power is 16 dBm

TRANSMITTER AND POWER CALIBRATION METHOD

BACKGROUND OF THE INVENTION

1. Field of the Invention

The present disclosure relates to a transmitter. More particularly, the present disclosure relates a transmitter and a power calibration method that utilize a current sensing to calibrate output power.

2. Description of Related Art

In most applications, output power of a transmitter must match target power such that a receiver can correctly identify a signal transmitted by the transmitter. However, in practical applications, when the load on an antenna of the transmitter changes, the output power of the transmitter will also change, which results in the inaccurate output power of the transmitter.

SUMMARY OF THE INVENTION

In some aspects, an object of the present disclosure is to, but not limited to, provide a transmitter and a power calibration method that utilize a current sensing to automatically calibrate output power, in order to make an improvement to the prior art.

In some aspects, a transmitter includes a transmitter circuit, a calibration circuit, and a transmitter signal strength indicator circuit. The transmitter circuit is coupled to a power node to receive a supply voltage and configured to transmit an output signal via an antenna. The calibration circuit is configured to sense a current of the power node to generate a first signal having a first value when the transmitter circuit operates in a first frequency band, sense the current to generate the first signal having a second value when the transmitter circuit operates in a second frequency band, and generate a calibration signal according to the first signal having the first value and the first signal having the second value. The transmitter signal strength indicator circuit is configured to detect power of the output signal to generate a first detection signal, and generate a second detection signal according to the calibration signal and the first detection signal, in which the transmitter circuit is further configured to adjust the power of the output signal to be target power according to the second detection signal.

In some aspects, a power calibration method includes the following operations: sensing a current of a power node to generate a first signal having a first value when a transmitter circuit operates in a first frequency band, wherein the transmitter circuit is coupled to the power node to receive a supply voltage and is configured to transmit an output signal via an antenna; sensing the current to generate the first signal having a second value when the transmitter circuit operates in a second frequency band; generating a calibration signal according to the first signal having the first value and the first signal having the second value; detecting power of the output signal to generate a first detection signal; and generating a second detection signal according to the calibration signal and the first detection signal, and adjusting the power of the output signal to be target power according to the second detection signal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "about", "approximate to", or "equal to" shall generally mean within 20 percent, preferably within 10 percent, and more preferably within 5 percent of a given value or range. Numerical quantities given herein are approximate, meaning that the term "about", "approximate to", or "equal to" can be inferred if not expressly stated.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system implemented with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, similar/identical elements in various figures are designated with the same reference number.

Figure 1:
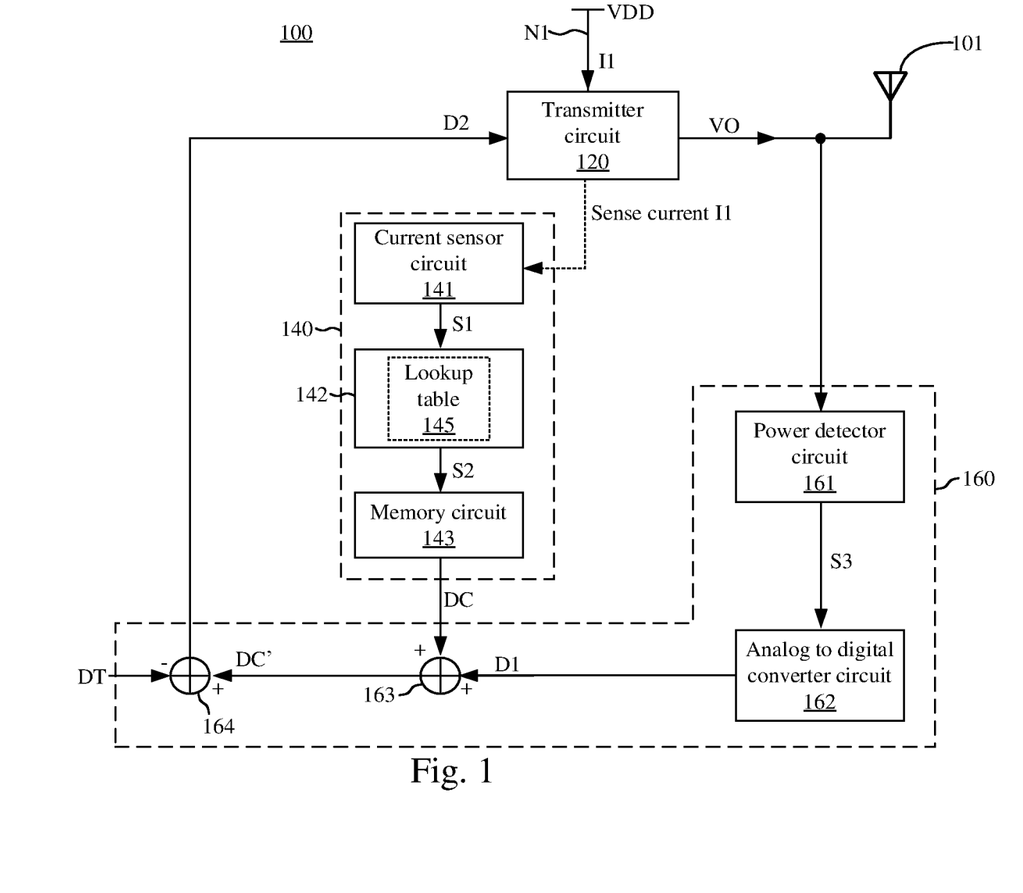
FIG. 1 illustrates a schematic diagram of a transmitter according to some embodiments of the present disclosure.

FIG. 1 illustrates a schematic diagram of a transmitter 100 according to some embodiments of the present disclosure. In some embodiments, the transmitter 100 has a mechanism for adjusting output power, which may correspondingly adjust the output power according to a return loss of an antenna, such that the practical output power of the transmitter 100 is able to reach target power.

The transmitter 100 includes a transmitter circuit 120, a calibration circuit 140, and a transmitter signal strength indicator circuit 160. The transmitter circuit 120 may transmit an output signal VO via an antenna 101. For example, the transmitter circuit 120 may include a baseband circuit (not shown), a digital to analog converter circuit (not shown), and a variable gain amplifier circuit (not shown). The baseband circuit may generate an input signal, the digital to analog circuit may convert the input signal into an analog signal, and the variable gain amplifier circuit may amplify the analog signal to generate the output signal VO. The transmitter circuit 120 may adjust a gain of the variable gain amplifier circuit according to the detection signal D2, in order to adjust the power of the output signal VO. In some embodiments, the transmitter circuit 120 is coupled to the power node N1 to receive a supply voltage VDD (e.g., 3.3 volts), and is powered by the supply voltage VDD. For example, the aforementioned amplifier circuit may be coupled to the power node N1 to receive the supply voltage VDD, in order to be powered by the supply voltage VDD. The above arrangements about the transmitter circuit 120 are given for illustrative purpose, and the present disclosure is not limited thereto.

In some embodiments, the transmitter circuit 120 may operate in one of multiple frequency bands. For example, those frequency bands may include, but not limited to, a first frequency band (e.g., a low frequency band), a second frequency band (e.g., a medium frequency band), and a third frequency band (e.g., a high frequency band), in which a frequency range of each of the first frequency band, the second frequency band, and the third frequency band is different from each other. For example, the frequency range of the third frequency band is higher than that of the second frequency band, and the frequency range of the second frequency band is higher than that of the first frequency band. In some embodiments, in 5G applications, the first frequency band may be a band corresponding to channel 36 to channel 64, the second frequency band may be a band corresponding to channel 100 to channel 144, and the third frequency band may be a band corresponding to channel 149 to channel 177.

The calibration circuit 140 senses a current I1 flowing into the transmitter circuit 120 from the power node N1 to generate a signal S1 having a first value when the transmitter circuit 120 operates in the first frequency band, senses the current I1 to generate the signal S1 having a second value when the transmitter circuit 120 operates in another frequency band (e.g., one of the second frequency band and the third frequency band), and generates a calibration signal DC according to signal S1 having the first value and the signal S1 having the second value. In some embodiments, if the resolution of the second value is not high enough, the calibration circuit 140 further sense the current I1 to generate the signal S1 having a third value when the transmitter circuit 120 operates in a other frequency band (e.g., a remaining one of the second frequency band and the third frequency band), and generates the calibration signal DC according to the signal S1 having the first value, the signal S1 having the second value, and the signal S1 having the third value.

In some embodiments, the calibration circuit 140 may determine an impedance offset and power compensation amount of the antenna 101 according to the signal S1 having the first value, the signal S1 having the second value, and/or the signal S1 having the third value, in order to the calibration signal DC. In practical applications, the impedance of the antenna 101 may have an offset due to impacts from environmental condition(s), a loading effect of a receiver-end device, and so on, which makes the power of the output signal VO be unable to reach the target power. The impedance offset of the antenna 101 may be monitored by observing the return loss of the antenna 101. Operations regarding herein will be given with reference to FIG. 2.

In some embodiments, the calibration circuit 140 includes a current sensor circuit 141, a memory circuit 142, and a memory circuit 143. The current sensor circuit 141 is configured to sense the current I1 to generate the signal S1 having a corresponding value when the transmitter circuit 120 operates in a specific frequency band. For example, the current sensor circuit 141 may sense the current I1 to generate the signal S1 having the first value when the transmitter circuit 120 operates in the first frequency band, sense the current I1 to generate the signal S1 having the second value when the transmitter circuit 120 operates in the second frequency band, and sense the current I1 to generate the signal S1 having the third value when the transmitter circuit 120 operates in the third frequency band. In some embodiments, the signal S1 may be, but not limited to, a digital signal.

The memory circuit 142 stores a lookup table 145, and search the lookup table 145 according to the signals having different values to generate a signal S2. In some embodiments, the memory circuit 142 may search the lookup table 145 according to the signals S1 having different values (e.g., the signal S1 having the first value and the signal S1 having the second value), in order to determine the impedance offset and the power compensation amount of the antenna 101. Arrangements of the lookup table 145 are given with reference to FIG. 4. In some embodiments, the memory circuit 142 may be, but not limited to, implemented with a dynamic random-access memory.

The memory circuit 143 generates the calibration signal DC according to the signal S2. In some embodiments, the memory circuit 143 stores code words for compensating the transmitter signal strength indicator (TSSI), which may be used to calibrate the output power detected by the transmitter signal strength indicator circuit 160 (there may be errors on the detected output power due to the output impedance offset of the transmitter circuit 120). In some embodiments, the memory circuit 143 may select one of the code words according to the signal S2, and output the selected code word to be the calibration signal DC. Alternatively, in some other embodiments, the memory circuit 143 may adjust the selected code word according to the signal S2, and output the adjusted code word to be the calibration signal DC. In some embodiments, the memory circuit 143 may be a register circuit. In some embodiments, the memory circuit 143 may be, but not limited to, implemented with an efuse circuit.

The transmitter signal strength indicator circuit 160 is configured to detect the power of the output signal VO and generate the detection signal D1 (which equals to the TSSI of the output signal VO), and generate the detection D2 according to the calibration signal DC and the detection signal D1. As a result, the transmitter circuit 120 may adjust the gain according to the detection signal D2 to adjust the power of the output signal VO to the target power, in order to compensate the power variation caused from the impedance offset of the antenna 101. For example, the transmitter signal strength indicator circuit 160 includes an auto gain control mechanism, the transmitter circuit 120 may adjust the gain of the amplifier circuit of in the transmitter circuit 120 according to the detection signal D2, in order to adjust the power of the output signal VO.

In some embodiments, the transmitter signal strength indicator circuit 160 includes a power detector circuit 161, an analog to digital converter circuit 162, an adder circuit 163, and a subtractor circuit 164. The power detector circuit 161 may detect the power of the output signal VO to generate a signal S3. The analog to digital converter circuit 162 converts the signal S3 into the detection signal D1. The adder circuit 163 sums up the detection signal D1 and the calibration signal DC to generate a signal DC'. The subtractor circuit 164 may subtract a target signal DT from the signal DC' to generate the detection signal D2, in which the target signal DT is to indicate the target power of the output signal VO. In some embodiments, the detection signal D1, the calibration signal DC, the signal DC', the detection signal D2 and/or the target signal DT may be digital signal(s). In some embodiments, the aforementioned signals may be analog signal(s), and the transmitter signal strength indicator circuit 160 may process those signals without employing the analog to digital converter circuit 162. In some other embodiments, those signals may be implemented with mixed signals (i.e., a combination of analog signal(s) and digital signal(s)). The arrangements of the transmitter signal strength indicator circuit 160 are given for illustrative purposes, and the present disclosure is not limited thereto.

Figure 2:
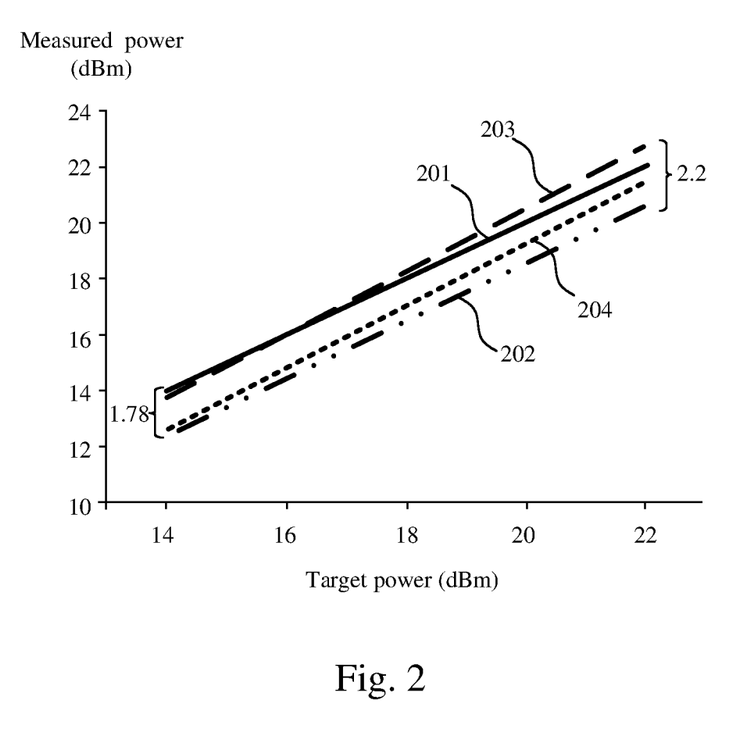
FIG. 2 illustrates a schematic diagram of the power variation of the output voltage in FIG. 1 when the return loss of the antenna is about 6 dB according to some embodiments of the present disclosure.

FIG. 2 illustrates a schematic diagram of the power variation of the output signal VO in FIG. 1 when the return loss of the antenna 101 is about 6 dB according to some embodiments of the present disclosure. As mentioned above, in practical applications, an offset may occur in the impedance the antenna, such that the power of the output signal VO may have unexpected variation(s). From experiment(s), if the absolute value of the return loss of the antenna 101 is higher (which indicates the reflected energy received by the antenna 101 is lower), the power variation of the output signal VO is lower; otherwise, if the absolute value of the return loss of the antenna 101 is lower (which indicates the reflected energy received by the antenna 101 is higher), the power variation of the output signal VO is higher. For example, if the return loss of the antenna 101 is about 10 dB, the range of the power variation the output signal VO is within about 1 decibel (dB). Correspondingly, if the return loss of antenna 101 is about 3-6 dB, the range of the power variation the output signal VO is about 2-3 dB. For example, as shown in FIG. 2, a segment 201 indicates the power variation of the output signal VO when there is no offset in the impedance of the antenna 101. When the target power is set to be 16 dBm, the power of the output signal VO is 16 dBm as well. In other words, when there is no offset in the impedance of the antenna 101, the power of the output signal VO can be linearly controlled.

A segment 202 indicates the power variation of the output signal VO when the return loss of the antenna 101 is about 6 dB (i.e., an offset is in the impedance of the antenna 101) and a phase of the output signal VO is about 60 degrees. A segment 203 indicates the power variation of the output signal VO when the return loss of the antenna 101 is about 6 dB and a phase of the output signal VO is about 240 degrees. A segment 204 indicates the power variation of the output signal VO when the return loss of the antenna 101 is about 6 dB and a phase of the output signal VO is about 330 degrees. By comparing the segment 201 with other segments 202-204, it is understood that when there is the offset in the impedance of the antenna 101, the power of the output signal VO may be varied with different phases of the output signal VO. For example, when the target power is set to be 14 dBm, the power variation of the output signal VO is about 1.78 dB. Alternatively, when the target power is set to be 22 dBm, the power variation of the output signal VO is about 2.2 dB. The above power variation may indicate that the output power of the transmitter circuit 120 may be too low. Thus, with the calibration circuit 140 to determine the impedance offset of the antenna 101 and adjust the output power of the transmitter circuit 120, the accuracy of the overall output power of the transmitter 100 can be improved.

Figure 3A:
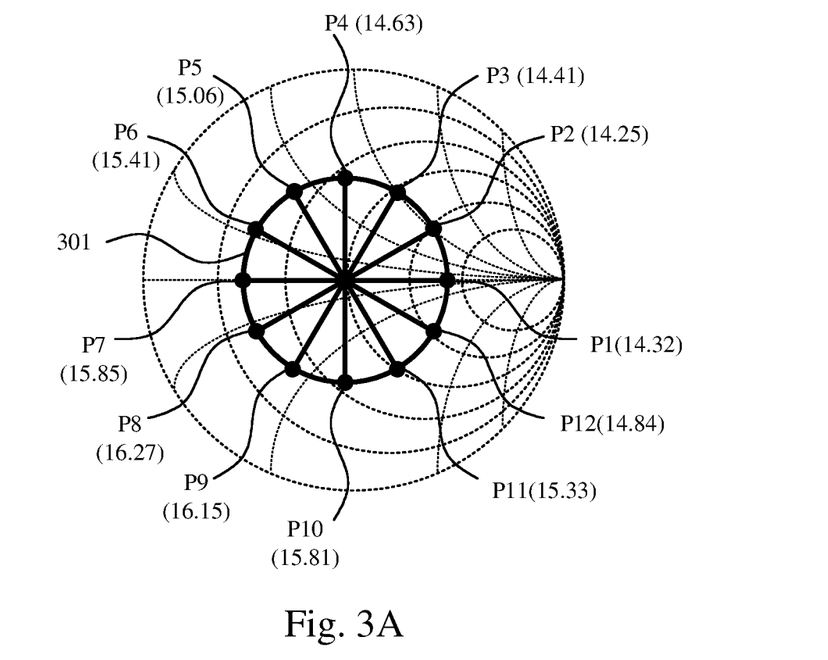
FIG. 3A illustrates a schematic diagram of a Smith chart indicates the power of the output signal when the return loss of the antenna in FIG. 1 is about 6 dB and the transmitter circuit operates in a high frequency band according to some embodiments of the present disclosure.

FIG. 3A illustrates a schematic diagram of a Smith chart indicates the power of the output signal VO when the return loss of the antenna 101 in FIG. 1 is about 6 dB and the transmitter circuit 120 operates in a high frequency band (i.e., the third frequency band) according to some embodiments of the present disclosure. In some embodiments, it may measure the impedance of the antenna 101 in FIG. 1 by setting target power and a target return loss to generate the Smith chart shown in FIG. 3A, in order to determine the impedance offset of the antenna 101. For example, in examples of FIG. 3A, the target power is set to be about 16 dBm. That is, ideally, the power of the output signal VO is expected to be about 16 dBm at different phases. The return loss of the antenna 101 is set to be about 6 dB. With S-parameters analysis, it is able to plot a circle 301 corresponding to a reflection coefficient S11 (which may indicate the return loss) of −6 dB on the Smith chart. In some embodiments, the reflection coefficient S11 may be considered as the negative of return loss.

The circle 301 includes points P1-P10, and each point indicates the power of the output signal VO at its different phases. For example, the point P1 indicates that the power of the output signal VO having a phase of about 0 degree is about 14.32 dBm when the return loss of the output signal VO is about 6 dB, the point P10 indicates that the power of the output signal VO having a phase of about 270 degrees is about 15.81 dBm when the return loss of the output signal VO is about 6 dB, and the point P12 indicates that the power of the output signal VO having a phase of about 330 degrees is about 6 dB when the return loss of the output signal VO is about 14.84 dBm.

Figure 3B:
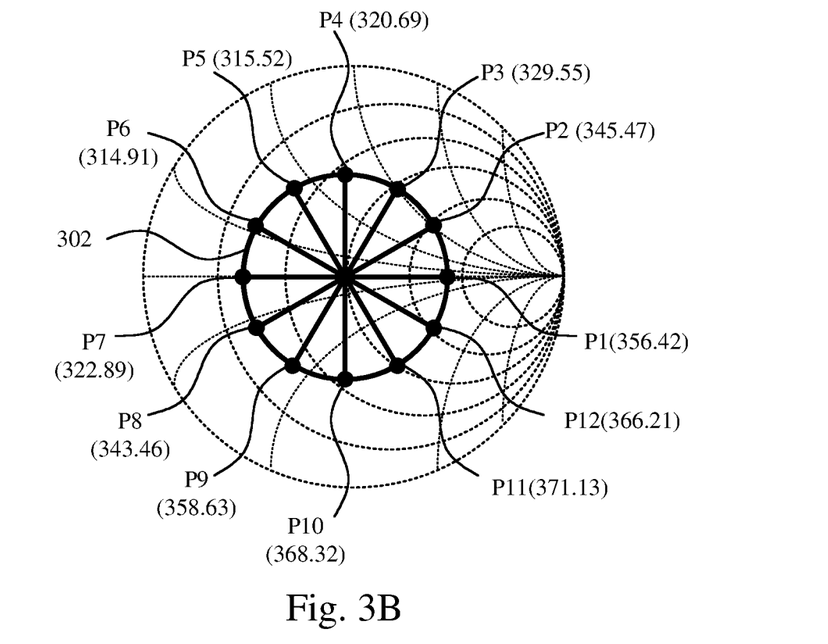
FIG. 3B illustrates a schematic diagram of a Smith chart indicates the value of the current when the return loss of the antenna in FIG. 1 is about 6 dB and the transmitter circuit operates in the high frequency band according to some embodiments of the present disclosure.

FIG. 3B illustrates a schematic diagram of a Smith chart indicates the value of the current I1 when the return loss of the antenna 101 in FIG. 1 is about 6 dB and the transmitter circuit 120 operates in the high frequency band (i.e., the third frequency band) according to some embodiments of the present disclosure. Corresponding to FIG. 3A, by sensing the current I1 in FIG. 1 to obtain the values of the current I1 at different phases, it is able to plot a circle 302 on the Smith chart. Corresponding to the circle 301, the circle 302 also includes the points P1-P10, in which the locations of the points P1-P10 in FIG. 3A are the same as those of the points P1-P10 in FIG. 3B. In FIG. 3B, each point indicates different values of the current I1 at different phases. For example, the point P1 indicates the value of the current I1 is about 356.42 mA when the phase of the output signal VO is about 0 degree and the return loss of the antenna 101 is about 6 dB, the point P10 indicates the value of the current I1 is about 368.32 mA when the phase of the output signal VO is about 270 degrees and the return loss of the antenna 101 is about 6 dB, and the point P12 indicates the value of the current I1 is about 366.21 mA when the phase of the output signal VO is about 330 degrees and the return loss of the antenna 101 is about 6 dB.

Figure 3C:
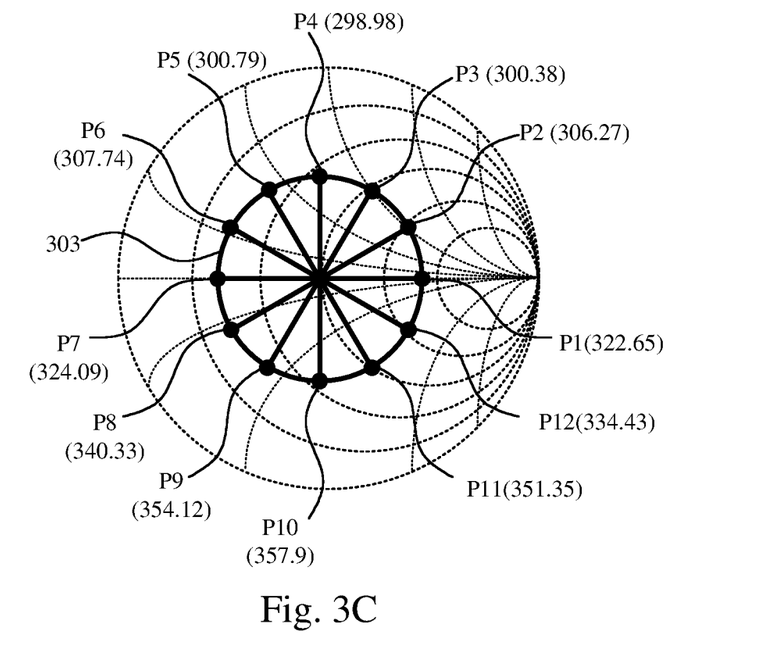
FIG. 3C illustrates a schematic diagram of a Smith chart indicates the value of the current when the return loss of the antenna in FIG. 1 is about 6 dB and the transmitter circuit operates in a low frequency band according to some embodiments of the present disclosure.

FIG. 3C illustrates a schematic diagram of a Smith chart indicates the value of the current I1 when the return loss of the antenna 101 in FIG. 1 is about 6 dB and the transmitter circuit 120 operates in a low frequency band (i.e., the first frequency band) according to some embodiments of the present disclosure. Similar to measurement conditions of FIG. 3B, in this example, the return loss of the antenna 101 is still set to be about 6 dB, and the transmitter circuit 120 is changed to operate in the low frequency band (i.e., the first frequency band). As a result, with the same measurement, it is able to plot different values of the current I1 at different phases on the Smith chart to form a circle 303. Corresponding to the circles 301 and 302, the circle 303 also includes the points P1-P10, in which locations of the points P1-P10 are the same as those of the points P1-P10 in FIG. 3A and FIG. 3B.

Similarly, in FIG. 3C, each point indicates the value of the current I1 at different phases. For example, the point P10 indicates the value of the current I1 is about 357.9 mA when the phase the output signal VO is about 270 degrees and the return loss of the antenna 101 is about 6 dB, and the point P12 indicates the value of the current I1 is about 334.43 mA when the phase the output signal VO is about 330 degrees and the return loss of the antenna 101 is about 6 dB.

Based on FIG. 3A, the power corresponding to the point P10 are really close to the target power (e.g., 16 dBm), a difference between the power corresponding to the point P12 and the target power is higher, and thus the calibration circuit 140 will perform power compensation to the impedance offset corresponding to the power offset. However, based on FIG. 3B, the value of the current I1 corresponding to the point P10 is really close to the value of the current I1 corresponding to the point P12. The difference between those two current values maybe lower than the resolution of the current sensor circuit 141, such that the calibration circuit 140 may be unable to accurately determine whether the impedance offset of the antenna 101 corresponds to the point P10 or the point P12 according the current I1 that is measured in one frequency band. Under this condition, the transmitter circuit 120 is controlled to operate in another frequency band (e.g., the first frequency band), and then the values of the current I1 corresponding to the points P10 and P12 are sensed again. As shown in FIG. 3C, the difference between the value of the current I1 corresponding to the point P10 and that corresponding to the point P10 is higher. Accordingly, with points that are mapped into different frequency bands, the calibration circuit 140 is able to determine whether the impedance offset of the antenna 101 corresponds to the point P10 or the point P12 more accurately.

On the other hand, as shown in FIG. 3B, the value of the current I1 corresponding to the point P5 (i.e., 315.52 mA) is really close to that corresponding to the point P6 (i.e., 314.91 mA). The current difference between those two values may be lower than the resolution of the current sensor circuit 141. Correspondingly, as shown in FIG. 3C, the difference between the value of the current I1 corresponding to the point P5 (i.e., 300.79 mA) and that corresponding to the point P6 (i.e., 307.74 mA) is higher. As a result, the calibration circuit 140 may determine whether the impedance offset of the antenna 101 corresponds to the point P5 or the point P6 more accurately. Accordingly, it is understood that, if the values of the current I1 that are measured when the transmitter circuit 120 operates in the low frequency band (i.e., the first frequency band) are still lower than the resolution of the current sensor circuit 141, it is able to control the transmitter circuit 120 to operate in another frequency band (e.g., the second frequency band), and then sense the value of the current I1 again. As a result, the points P1-P10 are equivalently mapped from the first frequency band into the second frequency band, and thus the impedance offset of the antenna 101 is able to be determined according to the points P1-P12 in the second frequency band.

Figure 4:
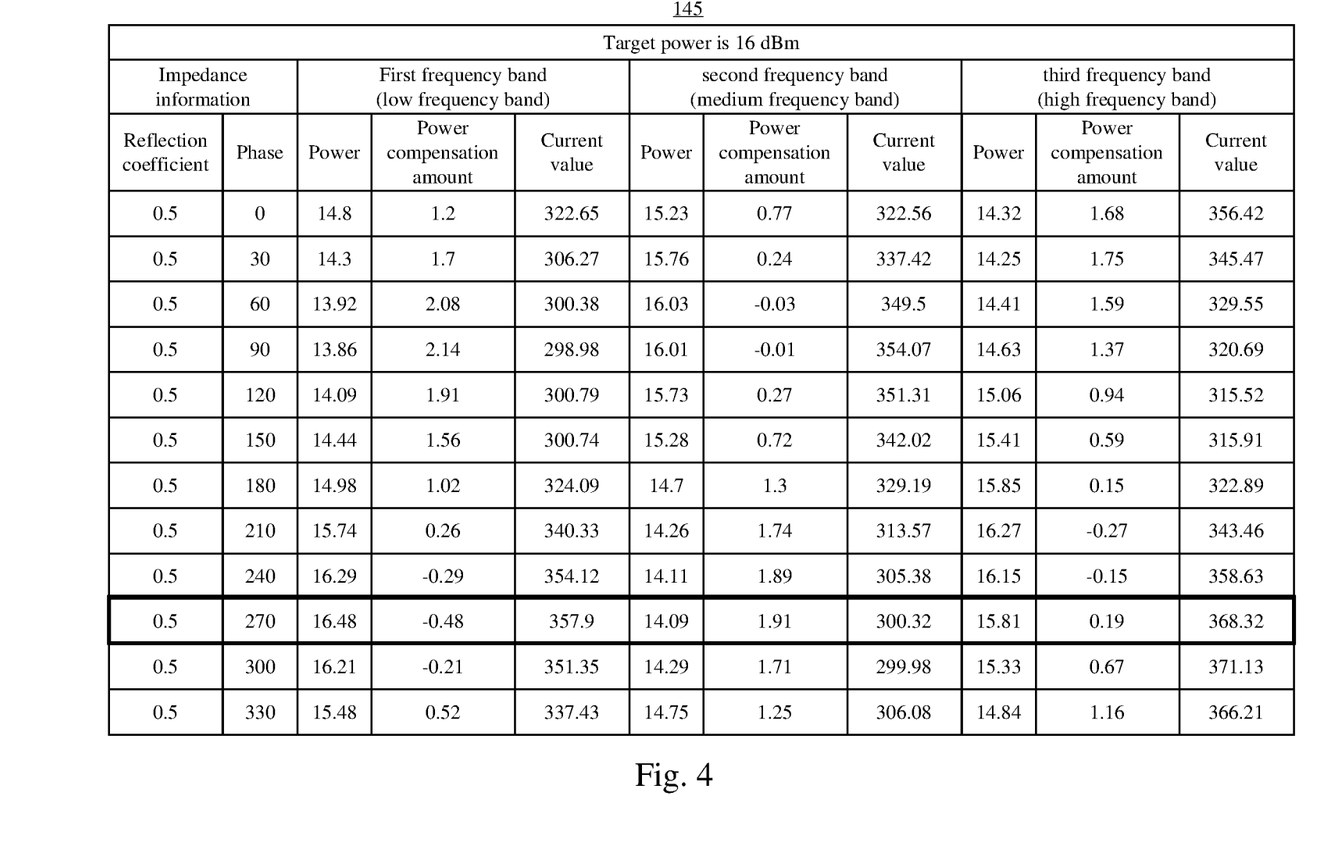
FIG. 4 illustrates a schematic diagram of the lookup table in FIG. 1 according to some embodiments of the present disclosure.

FIG. 4 illustrates a schematic diagram of the lookup table 145 in FIG. 1 according to some embodiments of the present disclosure. Based on the Smith chart shown in FIG. 3A to FIG. 3C, it is understood that in some embodiments, the lookup table 145 in FIG. 1 may be pre-established with measurements shown in FIG. 3A to FIG. 3C.

For example, the lookup table 145 in FIG. 4 corresponds to a case where the target power is about 16 dBm. The lookup table 145 may indicate relations among impedance information, first current values, second current values, and third current values. The impedance information indicates reflection coefficients (which may be 0.5 in this example, and its corresponding return loss is about 6 dB) of the antenna 101 measured based on different phases of the output signal VO. The first current values are values of the current I1 corresponding to different phases of the output signal VO when the transmitter circuit 120 operates in the first frequency band. The second current values are values of the current I1 corresponding to different phases of the output signal VO when the transmitter circuit 120 operates in the second frequency band. The third current values are values of the current I1 corresponding to different phases of the output signal VO when the transmitter circuit 120 operates in the third frequency band. On other hand, the lookup table 145 may further indicate relations among the impedance information, first power compensation amounts in the first frequency band, second power compensation amounts in the second frequency band, and third power compensation amounts in the third frequency band. Each of the first power compensation amounts, the second power compensation amounts, and the third power compensation amounts indicates a difference value between the power of the output signal VO and the target power in the corresponding frequency band.

In greater detail, in FIG. 3A and FIG. 3B (which correspond to the third frequency band), the power of the output signal VO corresponding to the point P10 is about 15.81 dBm, a difference between this power and the target power is about 0.19 dB (i.e., the third power compensation amount), and the value of the current I1 corresponding to the point P10 is about 368.32 mA (i.e., the third current value). Correspondingly, in FIG. 3C (which corresponds to the first frequency band), the power of the output signal VO corresponding to the point P10 is about 16.48 dBm, and a difference between this power and the target power is −0.48 dB (i.e., the first power compensation amount), and the value of the current I1 corresponding to the point P10 is about 357.9 mA (i.e., the first current value). Accordingly, by searching the lookup table 145, it is able to determine that the impedance information corresponding to the point P10 indicates that the reflection coefficient is about 0.5, and the phase of the output signal VO is about 270 degrees. As a result, the calibration circuit 140 may determine the impedance offset of the antenna 101 based on this impedance information (labeled with a bold line frame), and generate the corresponding signal S2 at different frequency bands according to the first power compensation amount, the second power compensation amount, and the third power compensation amount that correspond to the impedance information.

Figure 5:
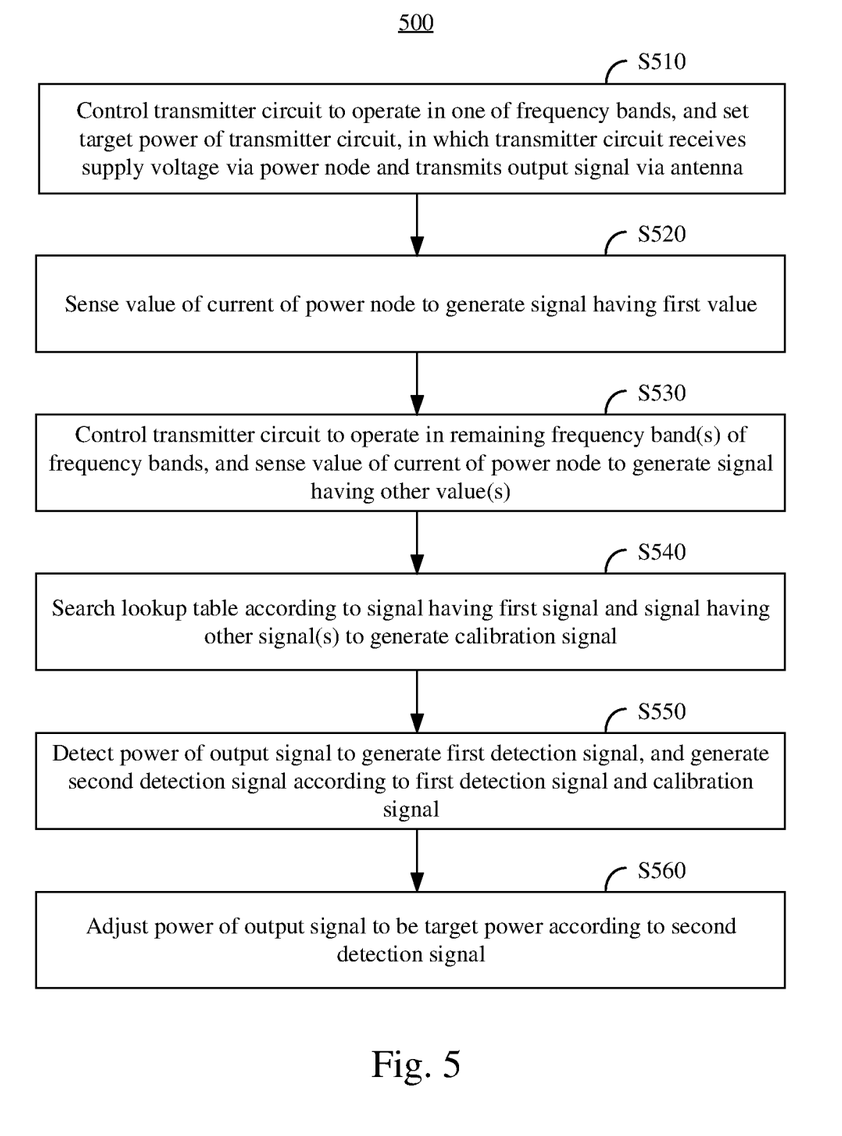
FIG. 5 illustrates a flow chart of a power calibration method according to some embodiments of the present disclosure.

FIG. 5 illustrates a flow chart of a power calibration method 500 according to some embodiments of the present disclosure. In some embodiments, the power calibration method 500 may be, but not limited to, performed by the transmitter 100 in FIG. 1.

In operation S510, a transmitter circuit is controlled to operate in one of multiple frequency bands, and target power of the transmitter circuit is set, in which the transmitter circuit receives a supply voltage via a power node and transmits an output signal via antenna. For example, with the control of software or a control circuit in the system (not shown), the transmitter circuit 120 may be controlled to operate in the first frequency band, and the target power of the transmitter circuit 120 may be set (e.g., the aforementioned 16 dBm).

In operation S520, a value of a current of the power node is sensed to generate a signal having a first signal. For example, the current sensor circuit 141 may sense the current I1 to generate the signal S1 having the first value.

In operation S530, the transmitter circuit is controlled to operate in remaining band(s) of the multiple frequency bands, and the value of the current of the power node is sensed to generate the signal having other values. For example, with the control of the software, the transmitter circuit 120 is controlled to operate in the second frequency band. Under this condition, the current sensor circuit 141 may sense the current I1 to generate the signal S1 having the second value. Similarly, the transmitter circuit 120 is then controlled to operate in the third frequency band. Under this condition, the current sensor circuit 141 may sense the current I1 to generate the signal S1 having the third value.

In operation S540, a lookup table is searched according to the signal having the first value and the signal(s) having other value(s) to generate a calibration signal. For example, as mentioned above, the memory circuit 142 may search the lookup table 145 according to the signal S1 having the third value to determine related information of the third frequency band, search the lookup table 145 according to the signal S1 having the first value to determine related information of the first frequency, and thus determine the impedance offset of the antenna 101. Afterwards, the memory circuit 142 may generate the calibration signal DC according to power compensation amounts corresponding to the impedance offset at different frequency bands. In some embodiments, if the related information of both of the first frequency band and the third frequency band are still unable to effectively determine the impedance offset, the memory circuit 142 may further search the lookup table 145 according to the signal S1 having the second value to find information related to the second frequency band, in order to determine the impedance offset of the antenna 101.

In operation S550, the power of the output signal is detected to generate a first detection signal, and a second detection signal is generated according to the first detection signal and the calibration. In operation S560, the power of the output signal is adjusted to be the target power according to the second detection signal. For example, the transmitter signal strength indicator circuit 160 may detect the power of the output signal VO to generate the detection signal D1, and sum up the detection signal D1 and the calibration signal DC to generate the detection signal D2. As a result, the transmitter circuit 120 may adjust the gain based on the detection signal D2, in order to adjust the power of the output signal VO.

The above operations of the power calibration method 500 can be understood with reference to above embodiments, and thus the repetitious descriptions are not further given. The above description of the power calibration method 500 includes exemplary operations, but the operations of the power calibration method 500 are not necessarily performed in the order described above. Operations of the power calibration method 500 may be added, replaced, changed order, and/or eliminated, or the operations of the power calibration method 500 may be executed simultaneously or partially simultaneously as appropriate, in accordance with the spirit and scope of various embodiments of the present disclosure.

It is understood that the above embodiments are illustrated with three frequency bands. In different embodiments, the above circuit arrangements, the lookup table 145, and the power calibration method 500 may be applied to applications only with two frequency bands. Accordingly, the above embodiments may be applied to applications with two or more than two frequency bands. Moreover, the above embodiments are illustrated with examples where the return loss is about 6 dB, but the present disclosure is not limited thereto.

As described above, the transmitter and the power calibration method provided in some embodiments of the present disclosure may sense a current at different frequency bands to effectively determine the impedance offset of the antenna and the corresponding power compensation amount, and thus calibrate the power of the transmitter to be the target power.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:
1. A transmitter, comprising:
   a transmitter circuit coupled to a power node to receive a supply voltage and configured to transmit an output signal via an antenna;

a calibration circuit configured to sense a current of the power node to generate a first signal having a first value when the transmitter circuit operates in a first frequency band, sense the current to generate the first signal having a second value when the transmitter circuit operates in a second frequency band, and generate a calibration signal according to the first signal having the first value and the first signal having the second value; and a transmitter signal strength indicator circuit configured to detect power of the output signal to generate a first detection signal, and generate a second detection signal according to the calibration signal and the first detection signal, wherein the transmitter circuit is further configured to adjust the power of the output signal to be target power according to the second detection signal.

2. The transmitter of claim 1, wherein the calibration circuit is configured to determine an impedance offset and a power compensation amount of the antenna according to the first value and the second value, in order to generate the calibration signal.

3. The transmitter of claim 1, wherein the calibration circuit comprises:

a current sensor circuit configured to sense the current to generate the first signal having the first value when the transmitter circuit operates in the first frequency band, and sense the current to generate the first signal having the second value when the transmitter circuit operates in the second frequency band;

a first memory circuit configured to store a lookup table and search the lookup table according to the first signal having the first value and the first signal having the second value to generate a second signal; and a second memory circuit configured to generate the calibration signal according to the second signal.

4. The transmitter of claim 3, wherein the lookup table is to indicate corresponding relations among a plurality of impedance information, a plurality of first current values, and a plurality of second current values, the plurality of impedance information indicate a plurality of reflection coefficients of the antenna that are measured based on different phases of the output signal, the plurality of first current values are values of the current corresponding to the different phases of the output signal when the transmitter circuit operates in the first frequency band, and the plurality of second current values are values of the current corresponding to the different phases of the output signal when the transmitter circuit operates in the second frequency band.

5. The transmitter of claim 4, wherein the lookup table is further configured to indicate relations among the plurality of impedance information, a plurality of first power compensation amounts in the first frequency band, and a plurality of second power compensation amounts in the second frequency band.

6. The transmitter of claim 4, wherein each of the plurality of reflection coefficients is −6 dB.

7. The transmitter of claim 3, wherein the first memory circuit is configured to search the lookup table according to the first signal having the first value and the first signal having the second value to determine an impedance offset and a power compensation amount of the antenna, in order to generate the second signal.

8. The transmitter of claim 1, wherein a frequency range of the first frequency band is different from a frequency range of the second frequency band.

9. The transmitter of claim 1, wherein the calibration circuit is further configured to sense the current to generate the first signal having a third value when the transmitter circuit operates in a third frequency band, and generate the calibration signal according to the first signal having the first value, the first signal having the second value, and the first signal having the third value, and a frequency range of each of the first frequency band, the second frequency band, and the third frequency band is different from each other.

10. The transmitter of claim 1, wherein the transmitter circuit is configured to adjust a gain according to the second detection signal to adjust the power of the output signal.

11. A power calibration method, comprising:

sensing a current of a power node to generate a first signal having a first value when a transmitter circuit operates in a first frequency band, wherein the transmitter circuit is coupled to the power node to receive a supply voltage and is configured to transmit an output signal via an antenna;

sensing the current to generate the first signal having a second value when the transmitter circuit operates in a second frequency band;

generating a calibration signal according to the first signal having the first value and the first signal having the second value;

detecting power of the output signal to generate a first detection signal, and generating a second detection signal according to the calibration signal and the first detection signal; and adjusting the power of the output signal to be target power according to the second detection signal.

12. The power calibration method of claim 11, wherein generating the calibration signal according to the first signal having the first value and the first signal having the second value comprises:

determining an impedance offset and a power compensation amount of the antenna according to the first value and the second value, in order to generate the calibration signal.

13. The power calibration method of claim 11, wherein generating the calibration signal according to the first signal having the first value and the first signal having the second value comprises:

searching a lookup table according to the first signal having the first value and the first signal having the second value to generate a second signal; and generating the calibration signal according to the second signal.

14. The power calibration method of claim 13, wherein the lookup table is to indicate corresponding relations among a plurality of impedance information, a plurality of first current values, and a plurality of second current values, the plurality of impedance information indicate a plurality of reflection coefficients of the antenna that are measured based on different phases of the output signal, the plurality of first current values are values of the current corresponding to the different phases of the output signal when the transmitter circuit operates in the first frequency band, and the plurality of second current values are values of the current corresponding to the different phases of the output signal when the transmitter circuit operates in the second frequency band.

15. The power calibration method of claim 14, wherein the lookup table is further configured to indicate relations among the plurality of impedance information, a plurality of first power compensation amounts in the first frequency band, and a plurality of second power compensation amounts in the second frequency band.

16. The power calibration method of claim 14, wherein each of the plurality of reflection coefficients is −6 dB.

17. The power calibration method of claim 11, wherein a frequency range of the first frequency band is different from a frequency range of the second frequency band.

18. The power calibration method of claim 11, further comprising:
sensing the current to generate the first signal having a third value when the transmitter circuit operates in a third frequency band, wherein a frequency range of each of the first frequency band, the second frequency band, and the third frequency band is different from each other.

19. The power calibration method of claim 18, wherein generating the calibration signal according to the first signal having the first value and the first signal having the second value comprises:
generating the calibration signal according to the first signal having the first value, the first signal having the second value, and the first signal having the third value.

20. The power calibration method of claim 11, wherein adjusting the power of the output signal to be the target power according to the second detection signal comprises:
adjusting a gain according to the second detection signal to adjust the power of the output signal.

* * * * *